(12) United States Patent
Filipovski et al.

(10) Patent No.: US 10,215,069 B2
(45) Date of Patent: Feb. 26, 2019

(54) PRESSURE RELIEF SYSTEM FOR DIESEL EXHAUST FLUID STORAGE

(71) Applicant: GM GLOBAL TECHNOLOGY OPERATIONS LLC, Detroit, MI (US)

(72) Inventors: Aleksandar Filipovski, Oshawa (CA); Mark J. Cremasco, Courtice (CA); Yong Pan, Markham (CA); Dirk Rensink, Mainz (DE); Biljana Rajic, Whitby (CA)

(73) Assignee: GM GLOBALY TECHNOLOGY OPERATIONS LLC, Detroit, MI (US)

( * ) Notice: Subject to any disclaimer, the term of this patent is extended or adjusted under 35 U.S.C. 154(b) by 226 days.

(21) Appl. No.: 15/240,123

(22) Filed: Aug. 18, 2016

(65) Prior Publication Data
US 2018/0051612 A1   Feb. 22, 2018

(51) Int. Cl.
| | | |
|---|---|---|
| *G06F 7/00* | (2006.01) | |
| *F01N 3/20* | (2006.01) | |
| *G07C 5/08* | (2006.01) | |

(52) U.S. Cl.
CPC ........... *F01N 3/2006* (2013.01); *F01N 3/206* (2013.01); *F01N 3/2066* (2013.01); *G07C 5/08* (2013.01); *F01N 2570/14* (2013.01); *F01N 2610/10* (2013.01); *F01N 2610/105* (2013.01); *F01N 2610/1406* (2013.01); *F01N 2610/1433* (2013.01); *F01N 2610/1486* (2013.01); *F01N 2900/1808* (2013.01); *F01N 2900/1811* (2013.01)

(58) Field of Classification Search
CPC ...... G01F 23/246; G01F 23/263; G01F 23/74; G01N 27/123; F01N 2570/14; F01N 2610/105; F01N 2610/1406; F01N 2610/1433; F01N 2610/1486; F01N 3/2006; F01N 3/206; G07C 5/08
See application file for complete search history.

(56) References Cited

U.S. PATENT DOCUMENTS

| | | | | |
|---|---|---|---|---|
| 4,493,302 | A * | 1/1985 | Kawamura | ........... F02D 41/401 123/357 |
| 2004/0065144 | A1* | 4/2004 | Mitani | ............... F02M 37/106 73/114.45 |
| 2013/0096757 | A1* | 4/2013 | Fukui | ............... F02M 25/0809 701/22 |
| 2014/0325965 | A1* | 11/2014 | Tuken | ................. F01N 3/208 60/286 |

(Continued)

*Primary Examiner* — Khoi H Tran
*Assistant Examiner* — Jorge O Peche
(74) *Attorney, Agent, or Firm* — Cantor Colburn LLP

(57) ABSTRACT

A system for diesel exhaust fluid (DEF) vessel pressure relief for a vehicle is includes a diesel exhaust fluid (DEF) storage tank, and a DEF pump assembly in an interior of the DEF storage tank. The DEF pump assembly includes a DEF pump having a pump body, a fluid pressure sensor fastened to an exterior of the pump body and configured to sense a DEF pressure, and a fluid temperature sensor fastened to the exterior of the pump body and configured to sense a DEF temperature. The system further includes a fluid channel, and a heating element in thermal communication with the fluid channel, where the heating element is configured to heat the fluid channel to displace DEF from a location proximate to the pump body.

19 Claims, 2 Drawing Sheets

(56) References Cited

U.S. PATENT DOCUMENTS

| | | | |
|---|---|---|---|
| 2015/0013646 A1* | 1/2015 | Qi | G01F 23/263 |
| | | | 123/478 |
| 2015/0032391 A1* | 1/2015 | Zanetti | G01F 23/74 |
| | | | 702/55 |
| 2016/0160731 A1* | 6/2016 | Turbak | F01N 13/002 |
| | | | 60/274 |
| 2016/0298515 A1* | 10/2016 | Gharpure | F01N 3/208 |
| 2017/0022867 A1* | 1/2017 | Qi | F01N 3/208 |
| 2017/0254243 A1* | 9/2017 | Hudgens | F01N 3/2066 |
| 2017/0321794 A1* | 11/2017 | Kiehlneker | F04C 2/102 |

* cited by examiner

PRESSURE RELIEF SYSTEM FOR DIESEL EXHAUST FLUID STORAGE

FIELD OF THE INVENTION

The subject invention relates to a storage vessel for diesel exhaust fluid, and more particularly, to a system for relieving pressure in the vessel upon freezing of the liquid.

BACKGROUND

Diesel engines are preferred for many heavy duty applications such as long-haul trucking, for instance, due to performance characteristics inherent in the Otto cycle upon which they are based. Unfortunately, such performance comes with the cost of an increase in certain regulated exhaust constituents. One class of exhaust constituents that must be controlled are oxides of Nitrogen (NOx) and one way of doing so, in automotive applications, is through the use of an active selective catalytic reduction device ("NOx trap") disposed in the exhaust system of the diesel engine. A typical NOx trap utilizes a catalyst coated substrate that is "activated" through the addition of a diesel exhaust fluid (DEF) that may be injected into the diesel exhaust gas at a location upstream of the trap. The DEF mixes with the diesel exhaust gas and reacts with the catalyst coated substrate in a known manner to reduce certain Oxides of Nitrogen (NOx compounds).

Automotive applications that employ DEF systems for the reduction of NOx may carry a supply of DEF in a tank that is fluidly connected via a supply system to the diesel engine exhaust system. A challenge in the design of these systems is that DEF tends to freeze around 11 degrees centigrade (−11° C.) which is well above the minimum operable temperature of the vehicle. Freezing of the DEF in the DEF tank may be driven in part by the thermal mass of the in-tank DEF pump assembly, resulting in the final fluid portion of the tank residing above or adjacent to the pump assembly. As the final fluid portion freezes, the DEF experiences an expansion rate of about 10% which results in the application of significant forces on the pump assembly. Damage may result.

It is desirable to provide a DEF system that avoids the damaging force that may result when DEF freezing occurs at low operating temperatures.

SUMMARY OF THE INVENTION

In one exemplary embodiment of the invention, a system for diesel exhaust fluid (DEF) pressure relief for a vehicle comprises: a diesel exhaust fluid (DEF) storage tank; a DEF pump assembly in an interior of the DEF storage tank, the DEF pump assembly comprising: a DEF pump having a pump body; a fluid pressure sensor fastened to an exterior of the pump body and configured to sense a DEF pressure; and a fluid temperature sensor fastened to the pump body and configured to sense a DEF temperature; a fluid channel; and a heating element in thermal communication with the fluid channel, wherein the heating element is configured to heat the fluid channel to displace DEF from a location proximate to the pump body to air space in the interior of the DEF storage tank.

In another exemplary embodiment of the invention, a method for diesel exhaust fluid (DEF) pressure relief for a vehicle comprises retrieving, via a processor, temperature information from a fluid temperature sensor configured on a pump body; retrieving, via the processor, pressure information from a fluid pressure sensor configured on the pump body; retrieving, via the processor, vehicle control information from a vehicle controller; transmitting, via the processor, to a heating element in thermal communication with a fluid channel, a signal to heat a fluid channel based on the temperature information, the pressure information and the vehicle control information; heating the fluid channel with the heating element; and displacing, via the heated fluid channel, DEF from a location proximate to a pump body.

In another exemplary embodiment, a vehicle having a system for diesel exhaust fluid (DEF) vessel pressure relief comprises: a diesel exhaust fluid (DEF) storage tank; a DEF pump assembly in an interior of the DEF storage tank, the DEF pump assembly comprising: a DEF pump having a pump body; a fluid pressure sensor fastened to an exterior of the pump body and configured to sense a DEF pressure; and a fluid temperature sensor fastened to the exterior of the pump body and configured to sense a DEF temperature; a fluid channel; and a heating element in thermal communication with the fluid channel, wherein the heating element is configured to heat the fluid channel to displace DEF from a location proximate to the pump body.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1A:
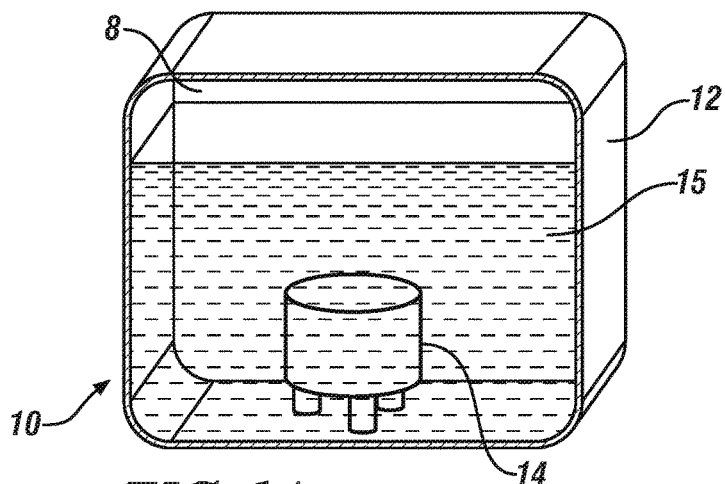
FIG. 1A is a diagram of one step in an exemplary freezing sequence of diesel exhaust fluid (DEF) in a DEF tank.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1B:
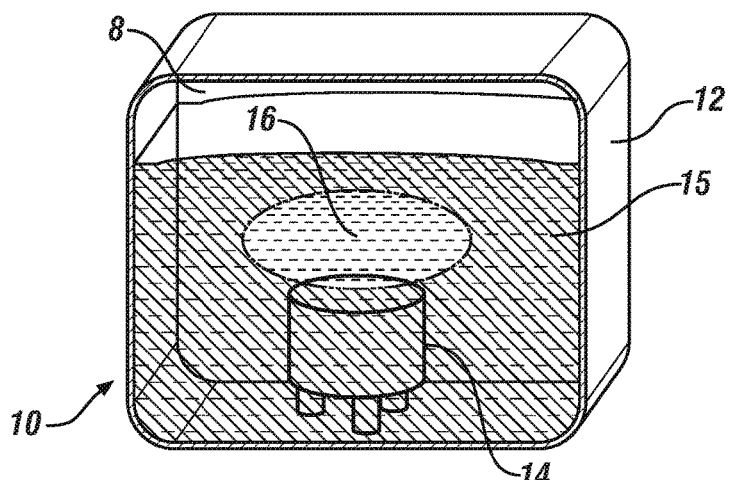
FIG. 1B is a diagram of a second step in an exemplary freezing sequence of diesel exhaust fluid (DEF) in a DEF tank.
Figure 1C:
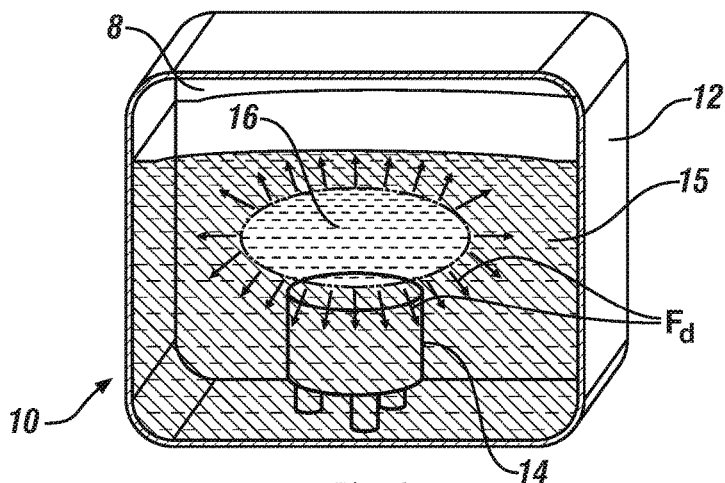
FIG. 1C is a diagram of a third step in an exemplary freezing sequence of diesel exhaust fluid (DEF) in a DEF tank.
Figure 2:
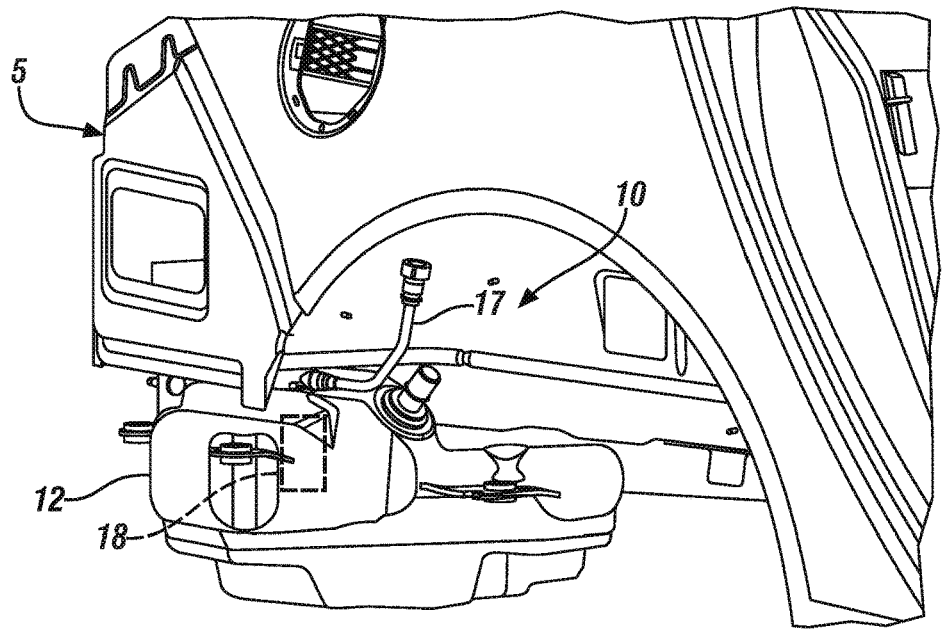
FIG. 2 is a partial view of a vehicle with a diesel exhaust fluid (DEF) storage relief system according to one embodiment.

In accordance with an exemplary embodiment of the invention, FIGS. 1A-1C illustrate a DEF system 10, of the type that may be installed in a vehicle having a diesel-type internal combustion engine (not shown), experiencing a freezing sequence of diesel exhaust fluid (DEF) 15. DEF system 10 includes a DEF storage tank 12 having a pump assembly 14 disposed therein. As noted above, automotive applications that employ DEF systems for the reduction of NOx may carry a supply of DEF 15 in DEF storage tank 12. DEF 15 may be fluidly connected, via a supply system (not shown), to the exhaust system of the vehicle (not shown). A challenge of some DEF systems occurs around −11 degrees centigrade (−11° C.), where DEF 15 tends to freeze. −11° C. is above the minimum operable temperature of the vehicle. DEF 15 in DEF storage tank 12 may freeze based on various factors. For example, the pump assembly 14 (as a thermal mass) may take longer to cool than surrounding DEF 15, and may therefore cause DEF, proximate to the pump assembly 14, to freeze last. As shown in FIG. 1B, DEF 15 tends to freeze from the exterior of DEF storage tank 12 to the interior of DEF storage tank 12. The freezing pattern may result in a final fluid portion 16 residing above or closely adjacent to the pump assembly 14. As depicted in FIG. 1C, as the final fluid portion 16 freezes, DEF 15 can experience an expansion rate of about 10%, which can result in the application of significant forces forces $F_d$ on pump assembly 14. It may be advantageous to provide a system configured to relieve fluid forces exerted on pump assembly 14 components. FIG. 2 depicts a DEF vessel pressure relief system 18 (hereafter "system 18") for a DEF storage tank 12.

Referring now to FIG. 2, in an exemplary embodiment, a vehicle 5 includes a DEF storage tank 12 that is configured to contain DEF 15, FIG. 1, for supply via a pressurized supply line 17 to the system. According to embodiments, DEF storage tank 12 includes a DEF vessel pressure relief system 18 (described in greater detail with respect to FIG. 3).

Figure 3:
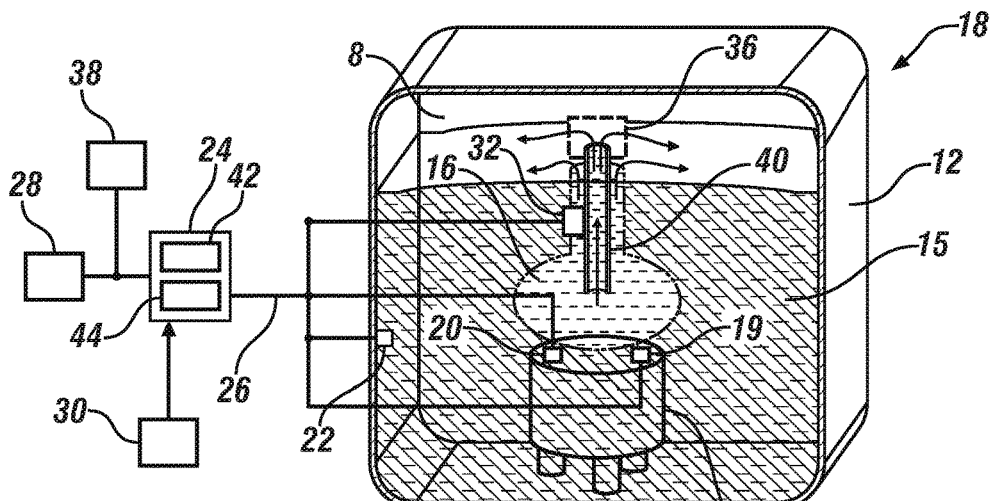
FIG. 3 is a schematic view of a diesel exhaust fluid (DEF) storage relief system according to one embodiment.

Referring now to FIG. 3, DEF vessel pressure relief system 18 (hereafter "system 18") is depicted, according to embodiments. System 18 may include a DEF storage tank 12, and a pump assembly 14 in an interior of the DEF storage tank 12. System 18 also includes a fluid channel 40, and a heating element 32 in thermal communication with fluid channel 40. Pump assembly 14 can include a DEF pump assembly 14 having a pump body 14A, a fluid pressure sensor 20 fastened to an exterior of pump body 14A, and a fluid temperature sensor 19 fastened to the exterior of pump body 14A. System 18 may further include, in embodiments, a fluid volume sensor 22, which may be fastened to an interior or exterior portion of DEF storage tank 12. System 18 may include and/or receive power from one or more of a vehicle power supply 38 and/or an independent power supply 28.

System 18 may operate, at least in part, based on a signal indicative of DEF fluid pressure exceeding a predetermined threshold. Fluid pressure sensor 20 may be configured to sense fluid pressure of DEF 15 (more particularly, sense fluid pressure of final fluid portion 16), and transmit a signal to control module 24 indicative of fluid pressure.

System 18 may further operate, at least in part, based on a signal indicative of DEF fluid temperature dropping below and/or above a predetermined threshold. A predetermined threshold for temperature may be, for example, −11° C. Fluid temperature sensor 19 may be configured to sense fluid temperature of final fluid portion 16, and transmit a signal to control module 24 indicative of fluid temperature.

Fluid channel 40 may be attached to DEF storage tank 12 such that one end of fluid channel 40 is immersed near pump assembly 14 such that the end nearest pump assembly 14 may receive a final fluid (unfrozen) portion 16 of DEF 15, and allow the DEF fluid to escape into air space 8. By escaping into air space 8, system 18 may relieve the force applied to pump assembly 14 by the final fluid portion 16.

Air space 8, in the interior of DEF storage tank 12, allows for the final fluid portion 16 to escape the pressurized bubble proximate to the exterior of the pump body, and thus, relieve the pressure exerted on pump assembly 14 due to thermal expansion of the frozen DEF 15. DEF storage tank 12 allows for air space 8 to remain in DEF storage tank 12 when filled to a predetermined maximum operational fluid level.

System 18 may further include a control module 24 (hereafter "control module 24"), that may be operatively connected to fluid temperature sensor 19, fluid pressure sensor 20, and heating element 32. Control module 24 may include a processor 44 and a memory module 42 operatively connected to processor 44.

According to some embodiments, control module 24 may be an independent controller operatively connected to a vehicle controller 30. In other aspects, control module 24 may be part of or integrated with vehicle controller 30. Control module 24 may be configured to receive vehicle control information from vehicle controller 30, including, for example, ambient temperature information indicative of an ambient temperature of the operating environment of vehicle 5. Vehicle control information may also include vehicle battery level information, and/or a vehicle status indicative of whether the vehicle is in operation (e.g., being driven, idling, etc.).

Control module 24 may be operatively connected to one or more of fluid temperature sensor 19, fluid pressure sensor 20, fluid volume sensor 22, and/or heating element 32 via control BUS 26. In embodiments, system 18 can include a DEF pressure relief pump 36, which can be operatively connected to control module 24 via control BUS 26. In some embodiments, control module 24 may be configured to receive one or more of temperature information from the fluid temperature sensor, pressure information from the fluid pressure sensor, and vehicle control information from a vehicle controller. Accordingly, control module 24 may transmit, to the heating element, a signal to heat the fluid channel based on the temperature information, the pressure information and the vehicle control information.

Fluid volume sensor 22 may be a proximity or other type of sensor configured to sense and transmit a signal indicative of the presence (or level) of DEF 15 in DEF storage tank 12.

As indicated, system 18 may include a DEF pressure relief pump 36. In some aspects, control module 24 may be configured to transmit a signal to the DEF pressure relief pump based on one or more of the temperature information, the pressure information and the vehicle control information. The signal may cause DEF pressure relief pump 36 to displace, via fluid channel 40, the final fluid portion 16 from the location proximate to the pump body 14A to the air space 8 in the interior of the DEF storage tank 12. In some aspects, control module 24 may transmit a signal to DEF pressure relief pump 36 to cease pumping operations after the processor determines, based on pressure information from fluid pressure sensor 20, that pump assembly 14 is no longer receiving fluid pressure from DEF 15 that exceeds normal operational pressure.

According to other embodiments, control module 24 may be configured to transmit a signal to heating element 32 to cease heating fluid channel 40 after the processor determines, based on pressure information from fluid pressure sensor 20, that pump assembly 14 is no longer receiving fluid pressure from DEF 15 that exceeds normal operational pressure. By ceasing heating operations once pressure is relieved, system 18 may relieve pressure applied to internal components while conserving system power resources.

System 18 may further include a vehicle power supply 38, which may be a power BUS of vehicle 5 shared with other electrical components of vehicle 5. In other embodiments, system 18 may include an independent power supply 28. Independent power supply 28 maybe separate from vehicle power supply 38, which may prevent depletion of a main vehicle battery on the main power BUS (not shown).

According to yet other embodiments, system 18 may include both of an independent power supply and vehicle power supply 38. Accordingly, control module 24 may receive, from vehicle controller 30, information indicative of a vehicle battery level of a vehicle battery, and switch power sources from vehicle power supply 38 to independent power supply 28 based on the vehicle battery level information. Accordingly, control module 24 may only activate independent power supply 28 when the vehicle battery level reaches a predetermined threshold indicative of a depleted state (e.g., having approximately 40%, 30% charge, etc.).

According to some embodiments, fluid channel 40 may be a tube constructed of heat conductive material such that heating element 32 can heat fluid channel 40 and allow the final fluid portion 16 of DEF 15 to escape through the interior of fluid channel 40. By heating fluid channel 40, heating element 32 may also create a flow channel on the outer portion of the tube, as space for fluid flow is created by melting any frozen DEF adjacent to the fluid channel. Heat conductive material may be, for example, stainless steel, copper, aluminum, etc.

In operation at lower temperatures (e.g., −11° C. or less), when DEF 15 is in a frozen state, a final fluid portion may remain at a location proximate to pump assembly 14. Without applied heat, frozen portions of DEF 15 may block the escape of final fluid portion 16 such that the pressurized bubble of final fluid portion 16 applies pressure to the top of pump assembly 14. Accordingly, in some embodiments, heating element 32 can heat fluid channel 40 until DEF 15 becomes liquid in the space surrounding fluid channel 40. In some aspects, fluid channel 40 may displace DEF from a location proximate to the pump body of pump assembly 14 to air space 8 in the interior of DEF storage tank 12. The displacement may occur as a result of internal forces applied to final fluid portion 16 forcing fluid through and around fluid channel 40. The displacement may also occur by pumping action.

Figure 4:
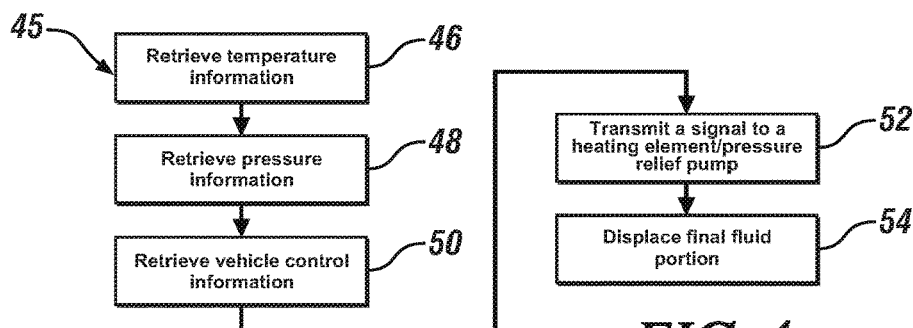
FIG. 4. is a method for operating the DEF storage relief system of FIG. 3 according to one embodiment.

Referring now to FIG. 4, a flow diagram of a method 45 for operating DEF vessel pressure relief system 18 is depicted, according to one embodiment. As shown in block 46, system 18 may retrieve, via processor 44, temperature information from fluid temperature sensor 19.

As shown in block 48, processor 44 may retrieve pressure information from fluid pressure sensor 20.

As depicted in block 50, processor 44 may retrieve vehicle control information from a vehicle controller.

As shown in block 52, processor 44 may transmit, based on the temperature information, the pressure information and the vehicle control information, a signal to heating element 32, causing heating element 32 to heat fluid channel 40. According to some embodiments, processor 44 may also transmit a signal to DEF pressure relief pump 36, which may cause DEF pressure relief pump 36 to begin pumping the liquid from the area proximate to pump body 14A to air space in storage tank 8.

As shown in block 54, system 18 may displace the final fluid portion 16 of DEF 15 from a location proximate to a pump body 14A to air space 8 in the interior of the DEF storage tank 12. According to some embodiments, system 18 displaces the final fluid portion by heating fluid channel 40 to a temperature sufficient to liquefy any frozen DEF in the area proximate to fluid channel 40. In some embodiments, processor 44 may transmit a signal to one or more of heating element 32 and/or DEF pressure relief pump 36 to cease heating and/or pumping operation. In some embodiments, DEF pressure relief pump 36 may not be included, and thus, the final fluid portion can self-relieve pressure when heating element 32 creates a liquid channel sufficient to allow free flow of final fluid portion 16 from the pressurized bubble proximate to pump assembly 14 to the air space 8. Accordingly, processor 44 may transmit the signal to cease heating operation only.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system for diesel exhaust fluid (DEF) pressure relief for a vehicle comprising:
   a diesel exhaust fluid (DEF) storage tank;
   a DEF pump assembly in an interior of the DEF storage tank, the DEF pump assembly comprising:
     a DEF pump having a pump body;
     a fluid pressure sensor fastened to an exterior of the pump body and configured to sense a DEF pressure; and
     a fluid temperature sensor fastened to the pump body and configured to sense a DEF temperature;
   a fluid channel; and
   a heating element in thermal communication with the fluid channel, wherein the heating element is configured to heat the fluid channel to displace DEF from a location proximate to the pump body to air space in the interior of the DEF storage tank.

2. The system of claim 1, wherein the fluid channel is a tube comprising heat conductive material.

3. The system of claim 1, further comprising a control module operably connected to the DEF pump assembly and the heating element, wherein the control module comprises a processor configured to:
   receive temperature information from the fluid temperature sensor;
   receive pressure information from the fluid pressure sensor;
   receive vehicle control information from a vehicle controller; and
   transmit, to the heating element, a signal to heat the fluid channel based on the temperature information, the pressure information and the vehicle control information.

4. The system of claim 3, wherein the vehicle control information comprises one or more of ambient temperature information indicative of an ambient temperature of the vehicle, and a vehicle status indicative of whether the vehicle is in operation.

5. The system of claim 3, further comprising a DEF pressure relief pump operatively connected to the control module and in fluid communication with the location proximate to the pump body.

6. The system of claim 5, wherein the control module is configured to transmit a signal to the DEF pressure relief pump causing the DEF pressure relief pump to displace, via the fluid channel, liquid DEF from the location proximate to the pump body to the air space in the interior of the DEF storage tank.

7. The system of claim 6, wherein the control module is configured to transmit the signal to the DEF pressure relief pump based on one or more of the temperature information, the pressure information and the vehicle control information.

8. The system of claim 3, further comprising a fluid volume sensor operatively connected to the control module and configured to sense a fluid volume inside the DEF storage tank, wherein the control module is further configured to:
receive fluid volume information from the fluid volume sensor; and
transmit, to the heating element, the signal to heat the fluid channel based on the temperature information, the pressure information, the fluid volume information, and the vehicle control information.

9. The system of claim 1, further comprising a power source configured to power the system, wherein the power source is independent of a main power supply of the vehicle.

10. A method for operating a diesel exhaust fluid (DEF) vessel pressure system on a vehicle comprising:
retrieving, via a processor, temperature information from a fluid temperature sensor configured on a pump body disposed inside of a DEF storage tank;
retrieving, via the processor, pressure information from a fluid pressure sensor configured on the pump body;
retrieving, via the processor, vehicle control information from a vehicle controller;
transmitting, via the processor, to a heating element in thermal communication with a fluid channel, a signal to heat a fluid channel based on the temperature information, the pressure information and the vehicle control information;
heating the fluid channel with the heating element;
displacing, via the heated fluid channel, DEF from a location proximate to a pump body;
retrieving, via the processor, fluid volume information from a fluid volume sensor inside the DEF storage tank; and
transmitting, via the processor, the signal to the heating element based on the temperature information, the pressure information, the fluid volume information, and the vehicle control information.

11. The method of claim 10, wherein the vehicle control information comprises one or more of ambient temperature information indicative of an ambient temperature, and a vehicle status indicative of whether the vehicle is in operation.

12. The method of claim 10, wherein the fluid channel is a tube comprising heat conductive material.

13. The method of claim 10, further comprising transmitting, via the processor, a signal to a relief pump; and
displacing, with the relief pump, via the fluid channel, liquid DEF from the location proximate to the pump body.

14. The method of claim 13, further comprising transmitting, via the processor, the signal to the relief pump based on one or more of the temperature information, the pressure information and the vehicle control information.

15. The method of claim 10, further comprising providing power to the processor and the heating element via an independent power source, wherein the independent power source is different from the main power supply of the vehicle.

16. A vehicle having a system for diesel exhaust fluid (DEF) vessel pressure relief comprising:
a diesel exhaust fluid (DEF) storage tank;
a DEF pump assembly in an interior of the DEF storage tank, the DEF pump assembly comprising:
a DEF pump having a pump body;
a fluid pressure sensor fastened to an exterior of the pump body and configured to sense a DEF pressure; and
a fluid temperature sensor fastened to the exterior of the pump body and configured to sense a DEF temperature;
a fluid channel;
a DEF pressure relief pump in the interior of the DEF storage tank; and
a heating element in thermal communication with the fluid channel, wherein at least one of the heating element and the DEF pressure relief pump is configured to displace DEF from a location proximate to the pump body.

17. The vehicle of claim 16, wherein the fluid channel is a tube comprising heat conductive material.

18. The vehicle of claim 16, further comprising a control module operably connected to the DEF pump assembly, the DEF pressure relief pump, and the heating element, wherein the control module comprises a processor configured to:
receive temperature information from the fluid temperature sensor;
receive pressure information from the fluid pressure sensor;
receive vehicle control information from a vehicle controller; and
transmit, to the heating element, a signal to heat the fluid channel based on the temperature information, the pressure information and the vehicle control information.

19. The vehicle of claim 18, wherein the vehicle control information comprises one or more of ambient temperature information indicative of an ambient temperature of the vehicle, and a vehicle status indicative of whether the vehicle is in operation.

* * * * *